US010928856B1

(12) United States Patent
Hamlin et al.

(10) Patent No.: US 10,928,856 B1
(45) Date of Patent: Feb. 23, 2021

(54) DOCKING RESPONSE TIME (71) Applicant: Dell Products, L.P., Round Rock, TX (US)

(72) Inventors: Daniel L. Hamlin, Round Rock, TX (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/589,891

(22) Filed: Oct. 1, 2019

(51) Int. Cl.
*G06F 1/16* (2006.01)
*G06F 9/4401* (2018.01)
*G06F 1/3234* (2019.01)
*G06F 1/3287* (2019.01)

(52) U.S. Cl.
CPC .......... *G06F 1/1632* (2013.01); *G06F 1/1601* (2013.01); *G06F 1/3265* (2013.01); *G06F 1/3287* (2013.01); *G06F 9/4403* (2013.01)

(58) Field of Classification Search
CPC ...................................................... G06F 9/546
See application file for complete search history.

(56) References Cited

U.S. PATENT DOCUMENTS

| 6,671,756 B1* | 12/2003 | Thomas | G06F 3/023 710/220 |
| 9,891,906 B1* | 2/2018 | Shen | G06F 9/54 |
| 2013/0298185 A1* | 11/2013 | Koneru | G06F 21/53 726/1 |

* cited by examiner

Primary Examiner — Jerry Wu
(74) Attorney, Agent, or Firm — Fogarty LLP (57) ABSTRACT Method and systems reduce response times when docking an Information Handling System (IHS) to a docking station. While the IHS is configured in a low-power mode and in transport in vicinity of the docking station, a proximity to the location of the docking station is detected. An upcoming event at the location the docking station may also be detected. Identities of peripheral devices coupled to the docking station are determined. Instructions are loaded for operation of the peripheral devices by the IHS, where the instructions are loaded without the IHS being coupled to the dock. The instructions may include a device table including addresses for communicating with the peripheral devices. Access to the peripheral devices is blocked until a coupling is detected between the IHS and the docking station. If no coupling is detected within a time threshold, the instructions for operation of the peripheral devices are unloaded.

20 Claims, 3 Drawing Sheets

DOCKING RESPONSE TIME

FIELD

This disclosure relates generally to mobile Information Handling Systems (IHSs), and more specifically, to docking of mobile IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Various types of mobile IHSs are presently in use, including laptop computers, hybrid laptops that support multiple different physical configurations, tablet computers and smartphones. Some of these mobile IHSs may be coupled to a docking station that supports the use of the mobile IHS while at a workstation that is available at a fixed location. In providing a workstation for mobile IHSs, the docking station may support operation of the mobile IHS using various peripheral devices, such as external displays, speakers, external keyboards and pointing devices. Upon coupling a mobile IHS to a dock provided at a docking station, a user may experience delays due to the time required to pair the mobile IHS to the dock and to the peripheral devices that are coupled to the dock.

SUMMARY

In various embodiments, a method is provided for reducing response times when docking an IHS Handling System (IHS). The method includes detecting, while the IHS is configured in a low-power mode, a proximity to a docking location; determining an identity of a plurality of peripheral devices coupled to a dock at the docking location; loading instructions for operation of the peripheral devices by the IHS, wherein the instructions are loaded without the IHS being coupled to the dock; blocking access to the peripheral devices; and unblocking access to the peripheral devices upon detecting a coupling between the IHS and the dock.

In additional method embodiments, the loading of instructions comprises generating a device table identifying the plurality of peripheral devices, wherein the device table comprises addresses for communicating respectively with each of the plurality of peripheral devices. In additional method embodiments, the loading of instructions comprises notifying an operating system of the IHS of the peripheral devices in the generated device table. In additional embodiments, the method further includes unloading the instructions for operation of the peripheral devices when no coupling is detected between the IHS and the dock within a time duration. In additional method embodiments, the proximity to the dock location is detected based on wireless signal information collected by the IHS while operating in the low-power mode. In additional method embodiments, the wireless signal information comprises a wireless signal from the dock, wherein the wireless signal identifies the dock. In additional method embodiments, the wireless signal identifies the plurality of peripheral devices coupled to the dock. In additional method embodiments, the wireless signal information is collected from a W-Fi signal broadcast that is detected in the vicinity at the docking location.

In various addition embodiments, an additional method is provided for reducing response times when docking an IHS Handling System (IHS). The method includes: detecting, while the IHS is configured in a low-power mode, an upcoming event at a docking location; determining an identity of a plurality of peripheral devices coupled to a dock at the docking location; loading instructions for operation of the peripheral devices by the IHS, wherein the instructions are loaded without the IHS being coupled to the dock; blocking access to the peripheral devices; and unblocking access to the peripheral devices upon detecting a coupling between the IHS and the dock.

In additional method embodiments, the upcoming event is determined based on a schedule associated with a user of the IHS. In additional method embodiments, the schedule specifies a location associated with the docking location. In additional method embodiments, the loading of instructions comprises generating a device table identifying the plurality of peripheral devices, wherein the device table comprises an address for communicating with each of the plurality of peripheral devices. In additional embodiments, the method further includes unloading the instructions for operation of the peripheral devices when no coupling is detected between the IHS and the dock within a time duration.

In various additional embodiments, an Information Handling System (IHS) includes: a plurality of logic units configured to operate while the IHS is configured in a standby power state to execute instructions causing the logic units to: detect, while the IHS is configured in a low-power mode, a proximity to a docking location; determine an identity of a plurality of peripheral devices coupled to a dock at the docking location; load instructions for operation of the peripheral devices by the IHS, wherein the instructions are loaded without the IHS being coupled to the dock; block access to the peripheral devices; and unblock access to the peripheral devices upon detecting a coupling between the IHS and the dock.

In additional embodiments, the IHS further includes a plurality of processors; a display; a plurality of storage devices utilized by the plurality of processors; and wherein the configuration of the IHS in a low-power mode comprises the plurality of processors, display and plurality of storage devices configured in respective low-power modes. In additional IHS embodiments, the loading of instructions comprises generating a device table identifying the plurality of peripheral devices, wherein the device table comprises an address for communicating with each of the plurality of peripheral devices. In additional IHS embodiments, the loading of instructions comprises notifying an operating system of the IHS of the peripheral devices in the generated device table. In additional IHS embodiments, the proximity to the dock location is detected based on wireless signal information collected by the IHS while operating in the low-power mode. In additional IHS embodiments, the wireless signal information comprises a wireless signal from the dock, wherein the wireless signal identifies the plurality of peripheral devices coupled to the dock. In additional IHS embodiments, the wireless signal information is collected from a W-Fi signal broadcast detected at the docking location.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
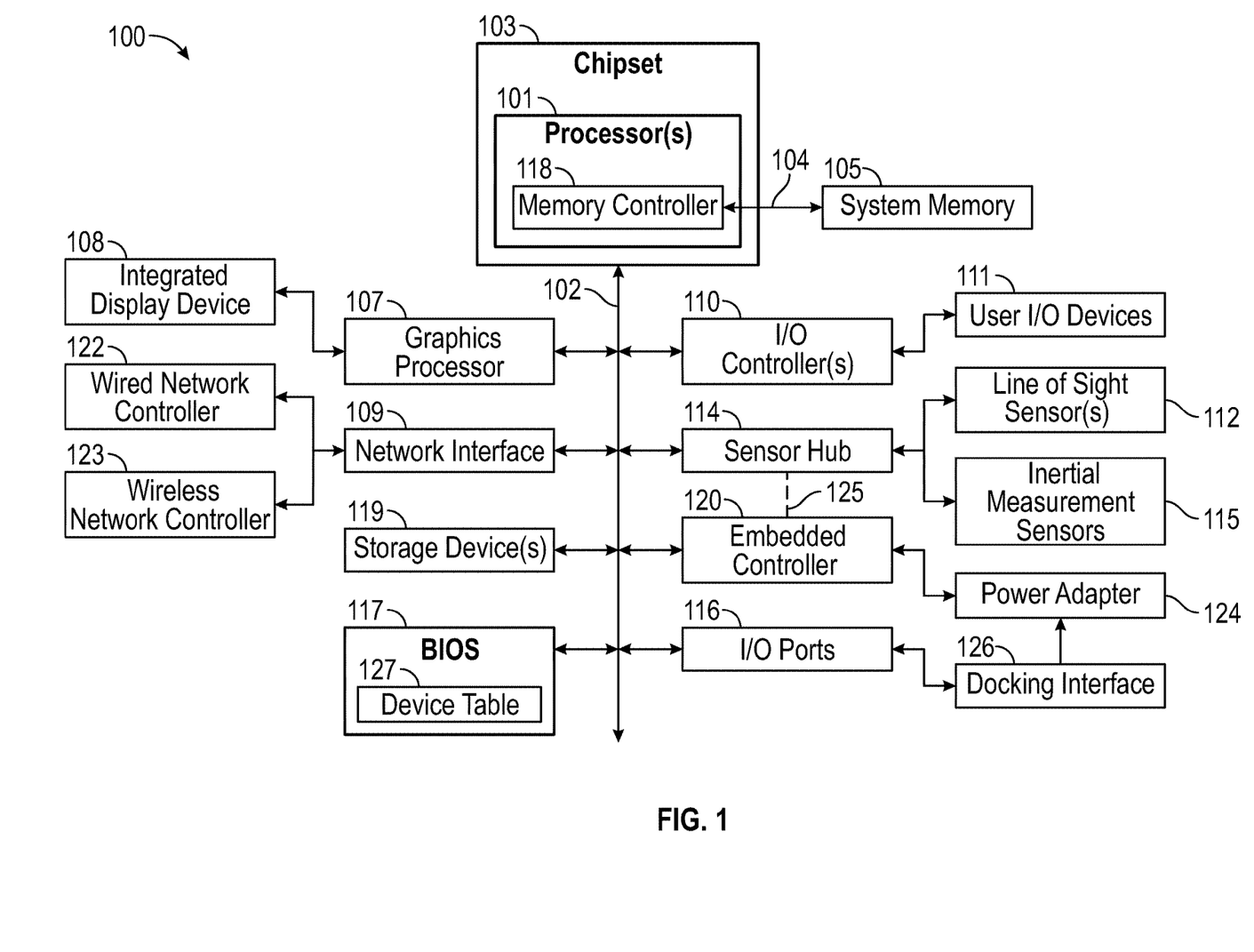
FIG. 1 is a block diagram depicting certain components of a mobile IHS configured according to various embodiments for supporting improved response times when docking the mobile IHS to a docking station.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

As described, a user may transport a mobile IHS 100 between various locations that may include a docking station to which the mobile IHS 100 may be coupled. By coupling the mobile IHS 100 to a docking station, one or more peripheral devices that are coupled to the docking station may be used to operate the mobile IHS 100. In order to utilize the docking station and the peripherals connected to the docking station, the mobile IHS may be paired to the docking station and the peripherals. The time required to complete such pairing operations upon coupling the mobile IHS 100 to the docking station may result in a delay during which the mobile IHS 100 cannot utilize the docking station. In certain instances, the mobile IHS 100 and/or docking station may be effectively inoperable by the user until such pairings have been completed. Accordingly, in various embodiments, a mobile IHS 100 may be configured such as described with regard to FIG. 1 to support preemptive pairing of mobile IHS 100 to a dock and peripherals coupled to the dock in order to support improved docking response times.

FIG. 1 is a block diagram illustrating certain components of a mobile IHS 100 configured according to certain embodiments for supporting improved response times when docking the mobile IHS 100. As described, a mobile IHS 100 may utilize a docking station that may provide power to mobile IHS 100 and may provide mobile IHS 100 with the use of various peripheral devices, that may include external display devices and user input devices such as keyboards and pointing devices. In certain embodiments, mobile IHS 100 may include a docking interface 126 by which the mobile IHS 100 may receive power, receive inputs from peripheral devices available via a connected dock and transmit outputs to the peripheral devices connected to the dock. In certain embodiments, docking interface 126 may include logic that executes program instructions to perform certain of the operations disclosed herein for supporting improved response times when connecting mobile IHS 100 to a docking station. In various embodiments, mobile IHS 100 may include an embedded controller 120 and a sensor hub 114 that may each execute program instructions that cause each of these components to perform certain of the operations disclosed herein. In certain embodiments, mobile IHS 100 may be configured as a member of an enterprise network by which a variety of computing services may be provided to IHS 100.

Mobile IHS 100 includes one or more processors 101, such as a Central Processing Unit (CPU), that execute code retrieved from a system memory 105. Although mobile IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104. The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

Mobile IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of separate buses to provide the illustrated pathways served by bus 102.

As illustrated, mobile IHS 100 may include a network interface 109 that may support different types of network connectivity. In certain embodiments, mobile IHS 100 may include one or more Network Interface Controllers (NIC), each of which may implement the hardware required for communicating via a specific networking technology, such as Wi-Fi, BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of mobile IHS 100 in supporting different types of network connectivity, such as the network connectivity utilized by the operating system of mobile IHS 100.

Chipset 103 may also provide access to one or more integrated display device(s) 108 via graphics processor 107. In certain embodiments, graphics processor 107 may be comprised within a video card, graphics card or within an embedded controller installed within mobile IHS 100. In certain embodiments, graphics processor 107 may be integrated within processor 101, such as a component of a system-on-chip. Graphics processor 107 may generate display information and provide the generated information to one or more integrated display device(s) 108 coupled to the IHS 100. The integrated display devices 108 coupled to mobile IHS 100 may utilize LCD, LED, OLED, or other display technologies. Each display device 108 may be capable of receiving touch inputs such as via a touch controller that may be an embedded component of the display device 108 or graphics processor 107, or may be a separate component of mobile IHS 100 accessed via bus 102. In some embodiments, power to graphics processor 107 and/or integrated display device 108 may be turned off, or configured to operate at minimal power levels, in response to mobile IHS 100 entering a low-power state. In certain embodiments, graphics processor 107 may also support use of one or more external display devices connected to a docking station and accessed via docking interface 126.

Chipset 103 also provides processor 101 with access to one or more storage devices 119. In various embodiments, storage device 119 may be integral to the mobile IHS 100, or may be external to the mobile IHS 100. In certain embodiments, storage device 119 may be accessed via a storage controller that may be an integrated component of the storage device. Storage device 119 may be implemented using any memory technology allowing mobile IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

In certain embodiments, mobile IHS 100 also includes a BIOS (Basic Input/Output System) 117 that may be stored in a non-volatile memory accessible by chipset 103 via bus 102. Upon powering or restarting mobile IHS 100, processor (s) 101 may utilize BIOS 117 instructions to initialize and test hardware components coupled to the IHS 100. The BIOS 117 instructions may also load an operating system for use by the mobile IHS 100. The BIOS 117 provides an abstraction layer that allows the operating system to interface with the hardware components of the mobile IHS 100 and, in some cases, configure them for direct operation via the operating system. The Unified Extensible Firmware Interface (UEFI) was designed as a successor to BIOS. As a result, many modern IHSs utilize UEFI in addition to or instead of a BIOS. As used herein, BIOS is intended to also encompass UEFI. In certain embodiments, BIOS 117 may be implemented by a secure execution environment operating on a dedicated microcontroller of mobile IHS 100.

In reflected in FIG. 1, the execution environment supported by BIOS 117 may include use of a device table 127 that identifies removable hardware devices that are coupled to I/O ports 116 and that may be operable on the mobile IHS 100, in some circumstances via an I/O controller 110. In certain embodiments, BIOS 117 may support certain low-power functions that may operate while mobile IHS 100 is configured in a reduced-power or low-power mode, such as a standby power mode. In some embodiments, such low-power operations of BIOS 117 may be utilized in generating a device table 127 for use in operating a dock and/or for operating peripheral devices coupled to the dock. In some embodiments, the device table 127 generated using low-power operations supported by BIOS 117 may be an ACPI (Advanced Configuration Power Interface) table that may be utilized by BIOS 117 and the operating system of mobile IHS 100 in the management of powering and providing access to the peripheral devices that are coupled to the mobile IHS, whether coupled directly to mobile IHS or coupled via a docking station. As described in additional detail below, in certain embodiments, BIOS 117 may be configured to implement low-power operations that generate a device table for use at a recognized dock that is coupled to a recognized set of peripheral devices. In some embodiments, the low-power operations of the BIOS 117 may additionally load the device table into a memory of the BIOS and ready the device table 127 for use in supporting use of the peripheral devices coupled to a docking station.

In certain embodiments, mobile IHS 100 may utilize one or more I/O controllers 110 that may each support hardware components such as user I/O devices 111. For instance, I/O controllers 110 may provide access to one or more user I/O devices 110 such as a keyboard, mouse, touchpad, touchscreen, microphone, speakers, camera and other input and output devices that may be integrated components of mobile IHS 100 or may be removable devices that are coupled to mobile IHS 100. Each of the supported user I/O devices 111 may interface with the I/O controller 110 through wired or wireless connections.

In various embodiments, mobile IHS 100 may include one or more I/O ports 116 that each support removeable couplings with various types of external devices and system. For instance, I/O 116 ports may include USB (Universal Serial Bus) ports, by which a variety of external devices may be coupled to mobile IHS 100. I/O ports 116 may include various types of physical I/O ports accessible to a user via the enclosure of the mobile IHS 100, where these physical I/O ports support couplings that may connect mobile IHS 100 with external devices and systems, such as couplings established with USB compatible devices via USB ports supported by mobile IHS 100.

In various embodiments, mobile IHS 100 may be coupled to a docking station via an I/O port 116, such as a USB-C port, that may serve as a docking interface 126. Other embodiments may utilize other types of I/O ports 116 as a docking interface 126 for coupling mobile IHS 100 to a docking station. As described, a docking station may provide mobile IHS 100 with power via a docking interface 126. In some embodiments, the docking interface 126 may also support data transmissions between the mobile IHS 100 and a connected docking station.

In the illustrated embodiment, mobile IHS 100 also includes a power adapter 124 that receives power inputs used for powering mobile IHS 100 and for charging batteries from which the mobile IHS 100 operates. Mobile IHS 100 may include a power port to which an AC adapter may be coupled. As described, docking interface 126 may also provide power to mobile IHS 100 while coupled to a docking station. For instance, mobile IHS 100 may include a USB-C port docking interface 126 that supports power delivery from a docking station. Power received from the docking interface 126 may be provided to the power adapter 124 for powering mobile IHS 100 and/or charging its batteries.

As illustrated, certain mobile IHS 100 embodiments may utilize a sensor hub 114 capable of determining the relative orientation and movement of the mobile IHS 100. For instance, sensor hub 114 may utilize inertial movement sensors 115, that may include accelerometer, gyroscope and/or magnetometer sensors. Such sensors 115 provide information that may be used by the sensor hub 115 in determining the current orientation and movement of mobile IHS 100 (e.g., mobile IHS 100 is motionless on a relatively flat surface or mobile IHS 100 is being moved irregularly and is likely in transport). This movement and orientation information may be utilized by the sensor hub 115 to determine whether the mobile IHS 100 is in transport and whether such periods of transport are ending. As described in additional detail with regard to FIG. 3, if a period of transport is ending, additional sensor data may be evaluated in order to determine the location to which the mobile IHS 100 has been transported. Based on various types of collected location information, a determination may be made regarding whether a docking station is available at the location. If a docking station is identified at the location, the mobile IHS 100 may be configured to preemptively initiate configuration for operation of peripheral devices available via the docking station.

In certain embodiments, sensor hub 114 may also include capabilities for determining a location and movement of mobile IHS 100 based on triangulation of network signals and based on network information provided by the operating system, by a network interface 109 and/or by embedded controller 120. As described in additional detail below, network information may be utilized in determining whether the current location of mobile IHS 100 corresponds to a known location, such as work or home location, where mobile IHS 100 has been previously used and is configured for use in a wireless network provided for use at that location. In some embodiments, such network information may be collected using low-power in order to determine an approximate location of the mobile IHS 100 while being transported or upon reaching a new location. The collected network information may be associated with a location at which a recognized docking station is provided. As described in additional detail with regard to FIG. 3, the low-power collection of wireless information may be further utilized to collect wireless signal information generated by a dock, where such signal information may identify the dock and the peripherals coupled to the dock.

In some embodiments, sensor hub 114 may support various types of line of sight sensors 112, such as optical, infrared and sonar sensors. The information collected by such line of sight sensors 112 may be used by sensor hub 114 to detect indications of a user's presence near mobile IHS 100. In certain scenarios, such line of sight sensors 112 may additionally provide support for xR (virtual, augmented, mixed reality) sessions hosted by the mobile IHS 100. As described in additional detail below, along with the movement and orientation from the inertial movement sensors 115, the information collected by line of sight sensors 112 and/or collected network information may be further utilized in various manners to determine the location of the mobile IHS 100 relative to a docking station location.

In certain embodiments, sensor hub 114 may be an independent microcontroller or other logic unit that is coupled to the motherboard of mobile IHS 100. In such embodiments, sensor hub 114 may communicate with various sensors and chipset 103 of processor 101 via a bus connection such as an Inter-Integrated Circuit (I2C) bus or other suitable type of multi-master bus connection. In certain embodiments, sensor hub 114 may operate from a separate power plane from the main processors 101 and thus the operating system functions of mobile IHS 100. In certain embodiments, sensor hub 114 may be a component of an integrated system-on-chip incorporated into processor 101 and may utilize an I2C bus for communicating with sensors, such as the inertial measurement sensors 115 and line of sight sensors 112. Sensor hub 114 may collect and processes data from such sensors using data fusion techniques in order to determine contextual information regarding the operational state of mobile IHS 100 for use in determining whether mobile IHS 100 is being transported and, upon arriving at a destination, identifying the location at which the mobile IHS 100 may be used.

As illustrated, mobile IHS 100 embodiments may utilize an embedded controller 120 that may be a motherboard component of mobile IHS 100 and may include one or more logic units. Like the sensor hub 114, in certain embodiments, embedded controller 120 may operate from a separate power plane from the main processors 101 and thus the operating system functions of mobile IHS 100. Embedded controller 120 may also implement operations for interfacing with a power adapter 124 in managing power for mobile IHS 100. Such operations may be utilized to determine the power status of mobile IHS 100, such as whether mobile IHS 100 is operating from battery power or is plugged into an AC power source.

Firmware instructions utilized by embedded controller 120 may be used to operate a secure execution environment that may include operations for providing various core functions of mobile IHS 100, such as power management, management of operating modes in which IHS 100 may be physically configured (e.g., determining a mode of a convertible laptop IHS based on the current hinge angle of the IHS reported by sensor hub 114) and support for certain integrated I/O functions. The operations of the secure execution environment of embedded controller 120 may include operations describe herein for use in for supporting improved response times upon the connecting mobile IHS 100 to a docking station. For instance, firmware of embedded controller 120 may include instructions that implement certain of the operations described with regard to sensor hub 114, such as interoperating with network controllers 122 and 123 and low-power operating system functions to collect network information while the mobile IHS 100 is in a standby power state and is being transported. In support of such configurations, in some embodiments, embedded controller 120 and sensor hub 114 may communicate during low-power states via an out-of-band signaling pathway 125 that allows the collection and processing of sensor inputs to be shared in various combinations between these two components.

Mobile IHS 100 may support the use of various power states. In some embodiments, the power states of a mobile IHS 100 may be implemented through operations of the embedded controller 120 and the operating system of the mobile IHS 100. In various embodiments, mobile IHS 100 may support various reduced power states in order to reduce power consumption and/or conserve battery power when mobile IHS 100 is not actively in use. The power states may include a fully on state in which the processor(s) 101 are fully powered, any storage devices 119 are powered and/or connected, any integrated displays 108 are fully powered, any previously configured network connections are initiated, and all other available components of mobile IHS 100 are also fully operational. In a fully off power state, processor(s) 101 are powered off, any integrated storage devices 119 are powered off and any remoted storage devices 119 are disconnected, any integrated displays 108 are powered off, network connections are disconnected, and power to all other components of mobile IHS 100 is off.

In an intermediate reduced-power state, various components of mobile IHS 100 may be powered down, but mobile IHS 100 remains ready for near-immediate use. For instance, in certain intermediate reduced-power states, processor(s) 101 remain powered, network connections remain connected, local and remote storage 119 remain powered and/or connected. However, in such reduced-power states certain components of mobile IHS 100 may be powered down, including integrated displays 108, output to any external displays, and certain peripheral devices coupled to mobile IHS 100. In various embodiments, different combinations of devices and resources may be powered and available during different reduced-power states.

In another intermediate low-power state, that may be referred to as a standby power state, sleep state or hibernation state, various types of state information may be stored to storage devices 119 and all but a selected set of components and low-power functions of mobile IHS 100 are shut down. For instance, the main components of the operating system may be shut down, processor(s) 101 may be powered down, storage devices 119 are powered down and/or disconnected, any integrated displays 108 are powered down and connections to external displays are disconnected, and any network connections are disabled. However, in some embodiments, certain low-power operations may continue in this low-power state that may otherwise be indistinguishable from a fully off state to the user. As described, in certain embodiments, low-power functions operating during a standby power state may include operations performed by sensor hub 114 and/or embedded controller 120 that may be separately powered from processor(s) 101. In addition, in certain embodiments, processor(s) 101 may include a system-on-chip or other logic unit capability that may be separately powered from the processor core and used to implement certain low-power operations during a standby power state. In some embodiments, the operating system of mobile IHS 100 may support the operation of certain low-power functions using this low-power processing capability. For instance, such low-power functions may provide network information collected by network controllers 122, 123 using network scanning and may provide information regarding the user of the mobile IHS, such as scheduling and message information. As described in additional detail herein, such low-power, standby power state operations may be utilized to anticipate docking of mobile IHS 100 to a docking station to configure mobile IHS 100 for operation using the docking station and peripheral devices coupled to the docking station.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2:
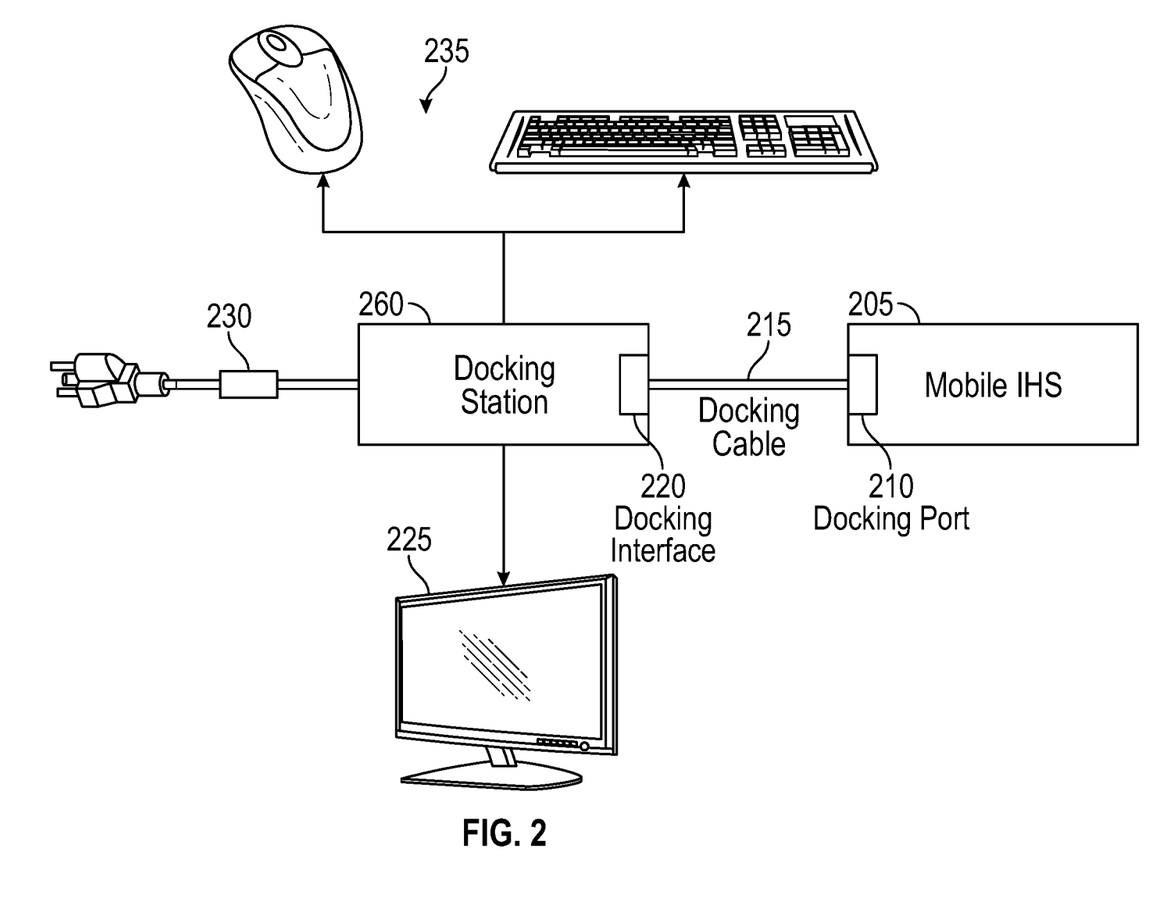
FIG. 2 is a block diagram depicting certain components of a docking system configured according to various embodiments for supporting improved response times when docking a mobile IHS to a docking station.

FIG. 2 is a block diagram illustrating certain components of a docking system that includes a docking station 260 and an IHS 205. In many scenarios, an IHS 205 that utilizes a docking station 260 may be a mobile IHS that may be used at various locations, including at a workstation at which docking station 260 is provided. As illustrated, a docking station 260 may provide a mobile IHS 205 with use of one or more external displays 225. A docking station 260 may also provide use of various peripheral I/O devices 235, such as a mouse and keyboard, which may be coupled to the docking station 260 via wired or wireless connections. While coupled to a docking station 260, mobile IHS 205 may be configured such that all user inputs and outputs generated in the operation of the mobile IHS 205 are provided via docking station 260, while some of the user input and output capabilities of mobile IHS 205 may be disabled.

As illustrated, a mobile IHS 205 may be coupled to a docking station 260 via a docking cable 215. In certain instances, the docking station 260 includes a docking interface 220 that receives one end of the docking cable 215 and the mobile IHS 205 includes a docking port 210 that receives the other end of the docking cable 215. Other types of docking interfaces require a mobile IHS to be plugged directly to a docking station, such as via mating of an external connector of the mobile IHS with a compatible coupling provided by the docking station. As illustrated, a docking station 260 may be coupled to an AC adapter 230 and by which the docking station 260 receives DC power. The docking station 260 may use the received DC power to provide power to mobile IHS 205. In FIG. 2, a docking cable 215 is used to connect the docking station 260 and the mobile IHS 205. In other docking scenarios, a wireless connection may be used to couple a mobile IHS 205 to a docking station 260. In some embodiments, a docking station 260 may include a capability by which the docking station 260 broadcasts a wireless signal identifying the docking station 260, and in certain instances, also identifying the peripheral devices 225, 235, coupled to the docking station 260.

Figure 3:
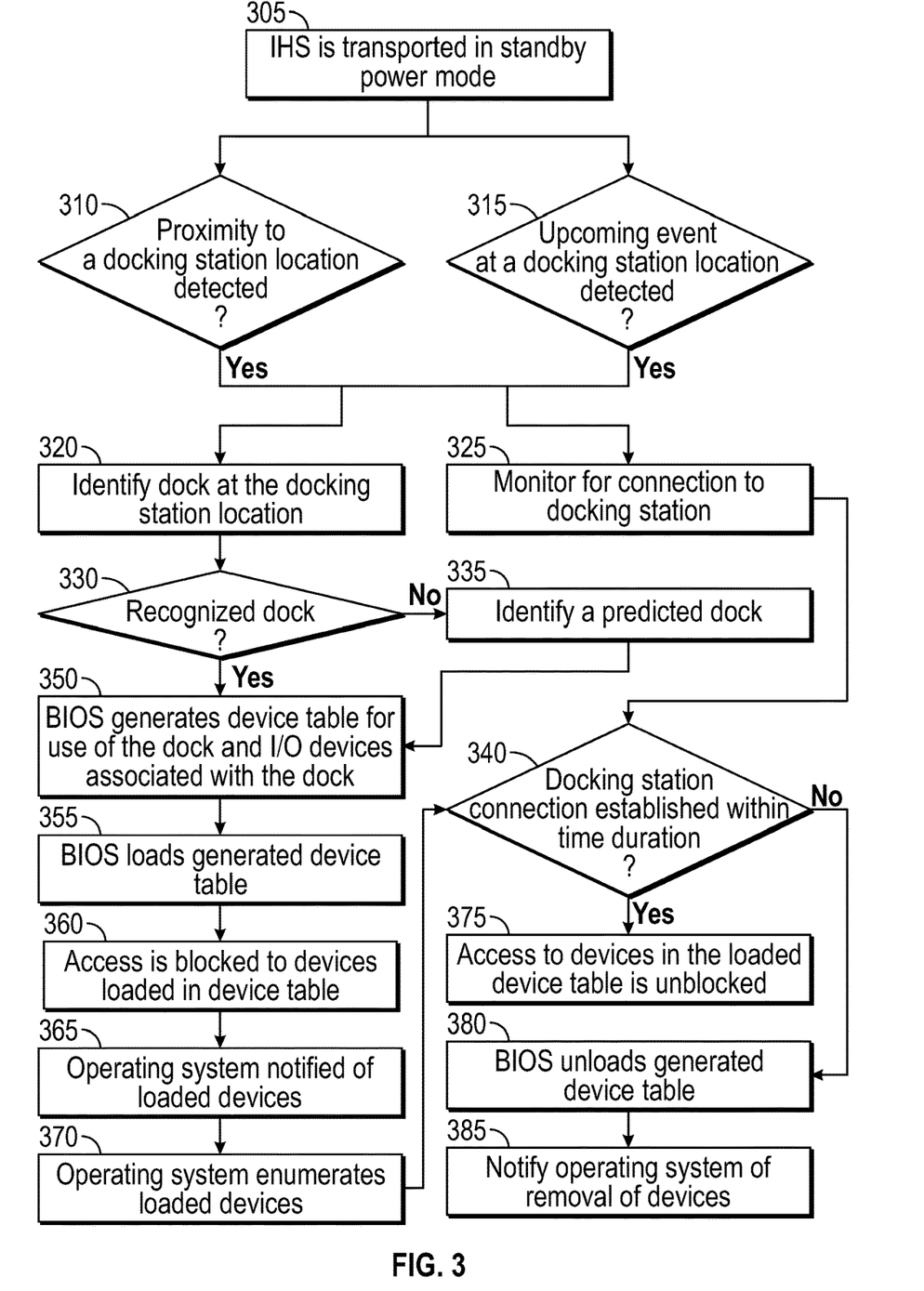
FIG. 3 is a flow chart diagram illustrating certain steps of a process according to various embodiments for supporting improved response times when docking a mobile IHS to a docking station.

FIG. 3 is a flow chart diagram illustrating certain steps of a process according to various embodiments for supporting improved response times when docking a mobile IHS to a docking station. In some scenarios, a mobile IHS such as a laptop computer may be placed within various types of bags for transport. In other scenarios, a mobile IHS may be carried by a user. Mobile IHSs that support multiple physical configurations, such as convertible laptops, may be carried by the user in various physical configurations and in various power states. Whether transported in a bag, carry directly by the user, or transported in another manner, at block 305, the mobile IHS is transported while configured in a standby power mode. As described, while configured in a standby power mode, many of the main components of mobile IHS, such as integrated displays, processors and storage drives, may be powered down, leaving only certain low-power operations functioning.

While operating in a standby power mode, at block 310, a mobile IHS such as described with regard to FIG. 1 may detect the proximity of the mobile IHS to a docking station location. In some embodiments, proximity to a docking station location may be determined based on detecting a wireless signal generated by the docking station. In such embodiments, a docking station may be configured to generate a wireless signal that identifies the docking station. In some embodiments, the generated wireless signal may identify the peripheral devices that are currently coupled to the docking station, such as an external monitor, pointing device, wireless keyboard, speakers, printer, etc. In various embodiments, the signal generated by the docking station may be broadcast on a periodic basis or may be generated in response to detecting a wireless broadcast by the mobile IHS. In some embodiments, the mobile IHS may approximate a distance to a docking station based on the strength of the identifying signal received from the docking station.

In some embodiments, proximity to a docking station location may be additionally or alternatively determined based on collected wireless network and other wireless signal information. For instance, a mobile IHS may be configured to detect Wi-Fi signals being broadcast by available networks. Based on a detected W-Fi signal, a mobile IHS may determine a location of the mobile IHS relative to a docking station location. For instance, in a scenario where a mobile IHS is being transported within a bag, the detection of a Wi-Fi signal of a wireless network provided by the employer of the user of the mobile IHS may indicate that the user is reaching a work location at which a docking station is provided. Detecting a Wi-Fi signal of the user's personal home wireless network similarly indicates that the user is reaching that location, which may be associated with a different docking station. In other embodiments, proximity to a docking station location may be determined based on other types of collected network information, such as a Bluetooth signal that indicates the presence of a recognized device known to be at a location in proximity to a docking station location. In some embodiments, mobile IHS may be configured to triangulate wireless network signals from different sources in order to determine a more precise location of the mobile IHS relative to a docking station.

As illustrated at block 315, in some embodiments, a docking station location may be determined based on user information, such as a user's schedule. For instance, while the mobile IHS is transported in a standby power mode, the mobile IHS may detect the user's scheduled participation in an upcoming event during which use of the mobile IHS via a docking station is anticipated. Based on location information associated with the upcoming event in the user's schedule, a specific docking station for use during the event may be identified. In certain embodiments, location determinations based on schedule information may be augmented based on collected network information, such as described above. As the mobile IHS continues in transport and the time until the upcoming event is within a specified threshold, the mobile IHS may determine that preemptive pairing of the mobile IHS to the docking station at the event location is warranted and may thus initiate preemptive configuration for operation of a dock and peripherals at the event location.

As describe with regard to FIG. 1, a mobile IHS according to embodiments may support certain low-power operations available for use during a standby power mode of the mobile IHS. Such low-power operations may be utilized, while the mobile IHS is configured in standby power mode, at block 310 and 315 in order to determine a proximity to a docking station location or an upcoming event at a docking station location. For instance, inertial movement sensors of the mobile IHS may generate movement and orientation information that may be utilized to determine whether the mobile IHS is being transported. Similarly, certain changes in collected movement and location information may indicate that transport of the mobile IHS is concluded and the user has reached a new location.

Upon detection indications that a new location has been reached, the mobile IHS may be configured to utilize additional low-power operations, such as certain wireless network operations for scanning for wireless signals and for sending certain wireless broadcasts. Such low-power network operations may be utilized to detect the wireless signal from a docking station, a W-Fi signal, a signal from a Bluetooth enabled device and/or various other wireless signals that may indicate the location of the mobile IHS relative to a docking station location. As described, a mobile IHS may include line of sight sensors that may support participation of a user of the mobile IHS in an xR session. In such embodiments, xR session information detected by such line of sight sensors may be utilized to determine, during low-power operations, a location of the mobile IHS relative to a docking station location.

Upon detecting a proximity to a docking station location within a threshold distance or detecting a close proximity to the time for an upcoming event at a docking station location, at block 320, the mobile IHS may continue use of standby power mode operations to identify the particular dock at the docking station location that has been reached, or is anticipated to be reached in the near future. As illustrated in FIG. 3, concurrent with the initiating of such procedures for identifying a particular dock, at block 325, monitoring for an actual docking connection to the docking station begins.

As described, in some embodiments, a dock may be configured to provide identifying information within a wireless signal generated by the dock. In such embodiments, the dock and peripheral devices coupled to the dock may be identified uniquely via information encoded in such wireless signals, thus allowing the mobile IHS to recognize known docks and user I/O devices. In some scenarios, a docking station location may be identified based on other wireless signal information, such as W-Fi signal information. In such scenarios where no identifying information is provided by the dock, the identity of the dock may be determined by referencing lookup tables associating recognized docking stations to collected wireless network location information. For instance, a recognized Wi-Fi network may be associated with a particular dock and peripheral devices typically coupled to that dock. Various of the other wireless signal information collected in determining proximity to a docking station location may in the manner be associated with a particular dock and set of peripheral devices. In certain embodiments, such associations may be generated through the use of machine learning techniques that evaluate wireless signal information from one or more recognized or unrecognized wireless signals as inputs and generate outputs identifying a dock and a set of peripheral devices.

If, at block 330, a particular dock and set of coupled user I/O devices can be identified, whether directly or indirectly, the low-power standby operations may continue, at block 350, with preemptively configuring the mobile IHS for interoperation with the dock and use of the I/O devices coupled to the dock. If a particular dock or I/O devices coupled to the dock cannot be identified, at block 335, a prior dock prediction may be utilized. Once a mobile IHS has been coupled to a dock and utilizes the I/O devices coupled to the dock, the user begins operation of the mobile IHS. After some duration, the mobile IHS is manually or automatically placed into a low-power or reduced-power mode. In some embodiments, upon detecting such a transition to a low-power or reduced-power mode, a prediction for the next docking station location may be generated and stored for later use. Such stored dock predictions may be retrieved, at block 335, in order to anticipate the identity of a dock at a docking station location even if the dock cannot be positively identified using techniques such as described above. In some embodiments, the generation of dock prediction may utilize machine learning techniques that may evaluate time and date information, schedule information for the user, and location information as inputs in order to determine a predicted next docking location. In certain scenarios, a user may regularly alternate between work and home docking station locations, thus supporting reliable predictions based on location information that identifies when the mobile IHS is at use at each of the locations. Machine learning techniques may account for variations in such patterns through evaluation of schedule information indicating times during which the user will be at certain locations, thus providing indications of the next anticipated docking station location.

Once a dock has been identified, directly, indirectly or based on a previously generated prediction, preemptive configuration will proceed based on the identity of the dock, at block 350, via the generation of a device table for use in supporting the operation of the dock and the peripheral devices coupled to that dock. As described with regard to FIG. 1, in some embodiments, a mobile IHS may include a BIOS that is configured to utilize a device table that identifies the peripheral devices that are coupled to the mobile IHS and that may further include information used for communicating with the peripheral devices. For instance, a generated device table may specify a set of peripheral devices coupled to a particular dock, such as external monitors, keyboards, pointing devices, etc. As described, a device table may additionally specify addresses to be used for communicating with each of these peripheral devices. At block 350, such a device table may be generated, with the device table specifying the peripheral devices that are available via the identified or anticipated dock.

Once a device table has been generated for operation of a particular dock, at block 355, operations of the BIOS of the mobile IHS may preemptively load the generated device table, thus readying it for use in supporting communications between the BIOS and peripheral devices. With the device table loaded by the BIOS, attempted communications with preemptively configured, but still unconnected, peripheral devices may result in errors. Accordingly, at block 360, the BIOS may block access to peripheral devices in the loaded device table. In some embodiments, the BIOS may block access to the loaded peripheral devices by blocking communications directed at the particular addresses used to identify the peripheral devices. In some embodiments, the BIOS may block the use of memory addresses and registers used to support interrupts for each of the loaded peripheral devices identified in the device table.

With access to the loaded peripheral devices blocked, at block 365, the BIOS may notify the mobile IHS operating system of the loaded peripheral devices. Upon receiving such notification, at block 370, the operating system may initiate certain operations enumerating the loaded peripheral devices, such as loading drivers for operation of the loaded peripheral devices, thus readying the devices for use via the operating system. In some embodiments, the preemptive configuration operations of blocks 365 and 370 by the operating system may be conducted during low-power standby power mode operations supported by the operating system. However, in some embodiments, such operations of the operating system may require waking the mobile IHS from the low-power standby power state to an intermediate power state in which additional operating system functions supporting device enumeration are enabled.

With the generated device table loaded by the BIOS and the loaded devices enumerated by the operating system, the peripheral devices of the dock may be quickly ready for use. As described above, concurrent with the initiation of preemptive configuration of the peripheral devices, monitoring for an actual connection to the dock may be initiated at block 325. Accordingly, such monitoring may continue while preemptive configuration of the peripheral devices is performed as described. Once the device table is loaded and the loaded devices are enumerated, at block 340, the BIOS determines whether an actual connection to the dock has been detected. In certain instances, the mobile IHS may be physically coupled to the dock while the preemptive configuration of the peripheral devices was proceeding as described. In other instances, the mobile IHS is docked after preemptive configuration has been completed.

If a connection to the dock is detected prior to expiration of a configurable time duration, at block 375, the BIOS unblocks access to the devices listed in the loaded device table. In some instances, preemptive configuration of the peripheral devices coupled to a dock may support immediate use of these peripheral devices by the user upon connecting the mobile IHS to the dock. In other instances, preemptive configuration of the peripheral devices may only be partially completed at the time the connection to the dock is established, thus requiring some additional configuration time before use of the peripheral devices is enabled. In either circumstance, preemptive configuration of the peripheral devices coupled to a dock support improved response times upon a mobile IHS being docked, since all or part of the configuration of the peripheral devices available by a dock may be completed prior to connecting the mobile IHS to a dock.

If a connection to the dock is not detected prior to expiration of the time duration, at block 380, the BIOS proceeds to unload the device table loaded at block 355. With no actual docking connection detected, the preemptive configuration of the peripheral devices available via the dock may be unnecessary. In order to conserve power and prevent unnecessary low-power operations in support of the preemptive configuration, the device table is unloaded, and at block 385, the operating system is notified of the removal of the devices in the device table. With the preemptive configuration reversed, standby power mode operations may continue at blocks 310 and 315 in detecting additional indications of a docking event upon which the described process of FIG. 3 may be repeated.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising: a plurality of logic units configured to operate while the IHS is configured in a standby power state to execute instructions causing the logic units to: detect, while the IHS is configured in a low-power mode, a proximity to a docking location; determine an identity of a plurality of peripheral devices coupled to a dock at the docking location; load instructions for operation of the plurality of peripheral devices by the IHS, wherein the instructions are loaded without the IHS being coupled to the dock; block access to the plurality of peripheral devices; and unblock access to the plurality of peripheral devices upon detecting a coupling between the IHS and the dock during the low-power mode.

2. The IHS of claim 1, further comprising:
a plurality of processors;
a display;
a plurality of storage devices utilized by the plurality of processors; and
wherein the configuration of the IHS in a low-power mode comprises the plurality of processors, display and plurality of storage devices configured in respective low-power modes.

3. The IHS of claim 1, wherein the loading of instructions comprises generating a device table identifying the plurality of peripheral devices, wherein the device table comprises addresses for communicating respectively with each of the plurality of peripheral devices.

4. The IHS of claim 1, wherein the loading of instructions comprises notifying an operating system of the IHS of the peripheral devices in the generated device table.

5. The IHS of claim 1, wherein the proximity to the dock location is detected based on wireless signal information collected by the IHS while operating in the low-power mode.

6. The IHS of claim 5, wherein the wireless signal information comprises a wireless signal from the dock, wherein the wireless signal identifies the plurality of peripheral devices coupled to the dock.

7. The method of claim 5, wherein the wireless signal information is collected from a Wi-Fi signal broadcast that is detected in the vicinity at the docking location.

8. A method for reducing response times when docking an Information Handling System (IHS), the method comprising: while the IHS is configured in a standby power state, executing instructions that cause a plurality of logic units of the IHS that are configured to operate in the standby power state to: detect, while the IHS is configured in a low-power mode, a proximity to a docking location; determine an identity of a plurality of peripheral devices coupled to a dock at the docking location; load instructions for operation of the plurality of peripheral devices by the IHS, wherein the instructions are loaded without the IHS being coupled to the dock; block access to the plurality of peripheral devices; and unblock access to the plurality of peripheral devices upon detecting a coupling between the IHS and the dock during the low-power mode.

9. The method of claim 8, wherein the loading of instructions comprises generating a device table identifying the plurality of peripheral devices, wherein the device table comprises addresses for communicating respectively with each of the plurality of peripheral devices.

10. The method of claim 9, wherein the loading of instructions comprises notifying an operating system of the IHS of the peripheral devices in the generated device table.

11. The method of claim 8, wherein the instructions executed by the plurality of logic units while in the standby power state further causes the logic units to: unload the instructions for operation of the peripheral devices when no coupling is detected between the IHS and the dock within a time duration.

12. The method of claim 8, wherein the proximity to the dock location is detected based on wireless signal information collected by the IHS while operating in the low-power mode.

13. The method of claim 12, wherein the wireless signal information comprises a wireless signal from the dock, wherein the wireless signal identifies the dock.

14. The method of claim 13, wherein the wireless signal identifies the plurality of peripheral devices coupled to the dock.

15. The method of claim 12, wherein the wireless signal information is collected from a Wi-Fi signal broadcast that is detected in the vicinity at the docking location.

16. A computer-readable storage device having instructions stored thereon for reducing response times when docking an Information Handling System (IHS), wherein execution of the instructions by one or more processors causes the one or more processors to: execute instructions, while the IHS is configured in a standby power state, that cause a plurality of logic units of the IHS that are configured to operate in the standby power state to: detect, while the IHS is configured in a low-power mode, a proximity to a docking location; determine an identity of a plurality of peripheral devices coupled to a dock at the docking location; load instructions for operation of the plurality of peripheral devices by the IHS, wherein the instructions are loaded without the IHS being coupled to the dock; block access to the plurality of peripheral devices; and unblock access to the plurality of peripheral devices upon detecting a coupling between the IHS and the dock during the low-power mode.

17. The storage device of claim 16, wherein the loading of instructions comprises generating a device table identifying the plurality of peripheral devices, wherein the device table comprises addresses for communicating respectively with each of the plurality of peripheral devices.

18. The storage device of claim 17, wherein the loading of instructions comprises notifying an operating system of the IHS of the peripheral devices in the generated device table.

19. The storage device of claim 16, wherein the instructions executed by the plurality of logic units while in the standby power state further causes the logic units to: unload the instructions for operation of the peripheral devices when no coupling is detected between the IHS and the dock within a time duration.

20. The method of claim 8, wherein the proximity to the dock location is detected based on wireless signal information collected by the IHS while operating in the low-power mode.

\* \* \* \* \*